United States Patent [19]

Lindley

[11] Patent Number: 4,567,053
[45] Date of Patent: Jan. 28, 1986

[54] METHOD OF INHIBITING SWEETNESS

[75] Inventor: Michael G. Lindley, Crowthorne, England

[73] Assignee: Tate & Lyle Public Limited Company, England

[21] Appl. No.: 599,260

[22] Filed: Apr. 11, 1984

[30] Foreign Application Priority Data

Apr. 12, 1983 [GB] United Kingdom ............... 8309855

[51] Int. Cl.$^4$ ............... A23L 1/22; C07C 53/132; A61K 9/20; A61K 31/70
[52] U.S. Cl. ............... 426/538; 426/658; 562/459; 562/465; 549/365; 424/49; 514/25
[58] Field of Search ............... 426/658, 538; 562/459, 562/463, 465, 496; 549/365, 447; 424/49, 180

[56] References Cited

U.S. PATENT DOCUMENTS 4,266,074  5/1981  Fujimoto et al. ............... 560/105
4,277,464  7/1981  Reussner et al. ............... 424/177
4,332,824  6/1982  Kahn et al. ............... 426/330.3

Primary Examiner—Steven Weinstein
Assistant Examiner—Elizabeth C. Weimar
Attorney, Agent, or Firm—Ostrolenk, Faber, Gerb & Soffen

[57] ABSTRACT

The sweetness of an ingestible product containing a sweetening sugar or sugar alcohol in large quantities can be reduced by incorporating therein a sweetness-reducing amount of at least one compound of the general formula:

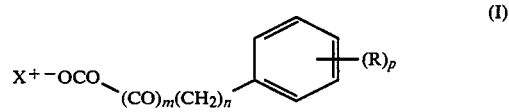

(I)

in which m represents 0 or 1, and when m represents 0, n represents 1, 2 or 3, and p represents 1, 2, 3 or 4, and when m represents 1, n represents 1 or 2 and p represents 0, 1, 2, 3 or 4; the substituents R, which may be the same or different, each represent a lower alkoxy group, e.g. with 1 to 5 carbon atoms, phenoxy group or a lower alkyl or trifluoromethyl group; and/or two substituents R together represent an aliphatic chain linked to the phenyl ring at two positions, either directly or via an oxa-group, e.g. an alkylenedioxy, alkenylenedioxy, alkylenoxy or alkenylenoxy group; and/or one substituent R represents a hydroxy group while at least one other substituent R represents an alkoxy group; and X+ represents a physiologically acceptable cation.

14 Claims, 1 Drawing Figure

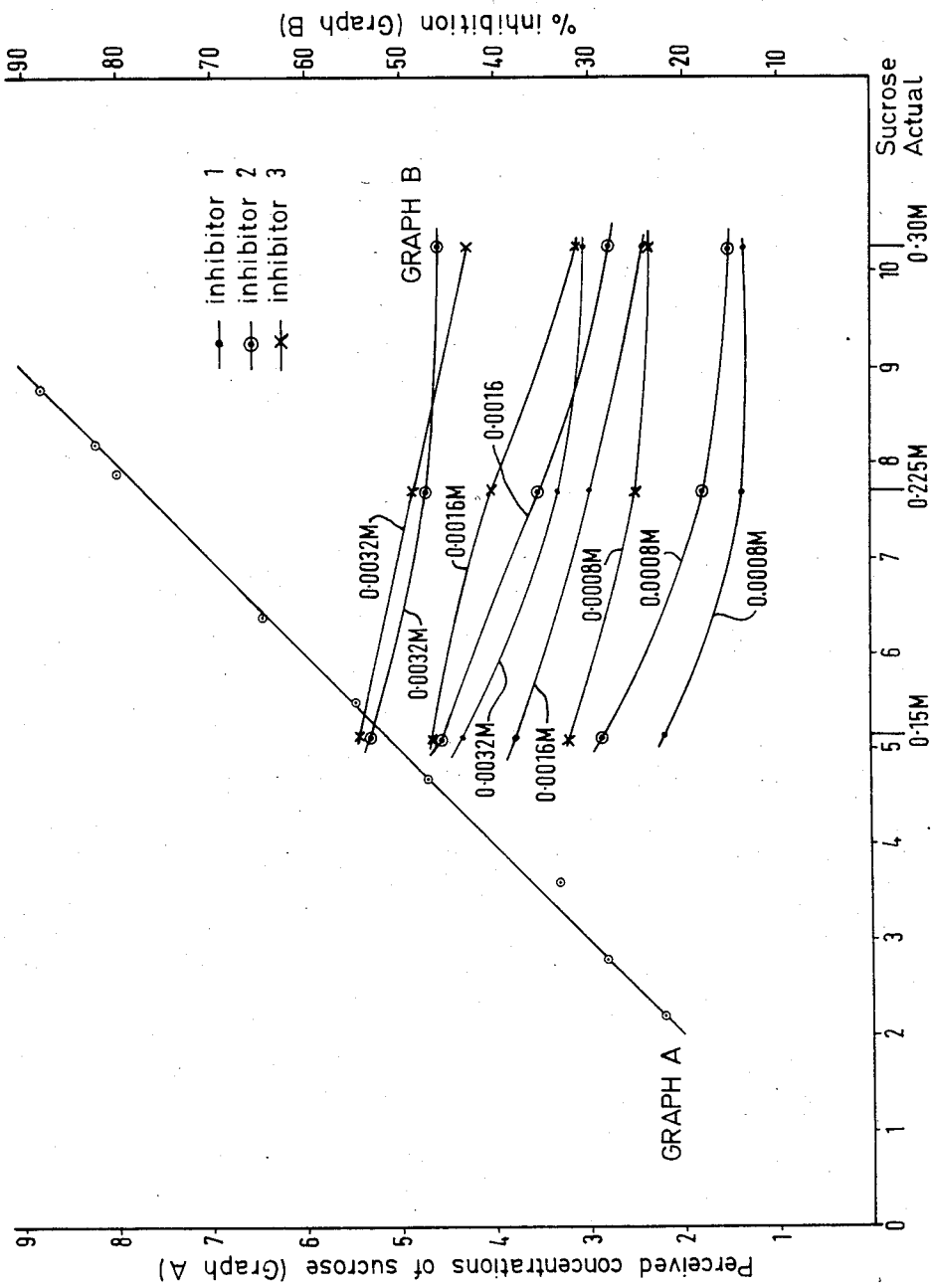

METHOD OF INHIBITING SWEETNESS

This invention relates to the use of a series of aralkyl carboxylic acid salts as sweetness inhibitors and to sweet compositions containing them and which possess a lower degree of sweetness than corresponding compositions in which they are not included.

Sugar, i.e. sucrose, is not only a sweetener, it is also an essential structural ingredient of many food products, especially in the field of confectionery. In the manufacture of chocolate and various sweets and candies, it is often desired to increase the sugar content of the composition but a limit is reached beyond which the product becomes too sweet or sickly. Similarly, the antimicrobial action of sugar as exhibited only at certain high levels, e.g. in jams and preserves. There is thus a need for a way of reducing the sweetness of a high sugar confectionery product so that a pleasant flavour can be obtained while the sugar content is kept high. A sugar such as sucrose, has properties which, were it not for the sweetening power, would render it of considerable interest in savoury food products such as soups, sauces and snack products and also "moist" pet foods. A sucrose which had "lost" its sweetness would thus be highly desirable in other food areas than confectionery. Other sweet sugars are similarly useful in part for their technical properties. for example high-fructose syrups.

Another area in which the sweetness of sugars can be a problem is in the supply of carbohydrate to patients suffering from renal problems. Conventionally a concentrated glucose syrup is taken orally. This product is however difficult to take in quantity because of its sickly nature. Attempts have been made to render it more palatable with various flavourings. A less sweet product is clearly of considerable interest to the pharmacist.

Finally, other sweet substances allied to sugars, such as the sugar alcohols, are useful for purposes not related to their sweetness, for example humectants such as sorbitol. Beyond a certain level, these substances contribute a degree of sweetness which might be undesirable in some formulations.

U.K. patent application GB No. 2 066 639A describes and claims the substitution of sucrose in food products by isomaltulose, in order to reduce the sweetness. Such a process, of course, requires the manufacture of isomaltulose itself, which is generally obtained by enzymic isomerisation of sucrose. The incorporation of large quantities of isomaltulose into a food product must therefore, inevitably, increase the cost of the sugar content of the foodstuff. This technique obviously cannot be applied in the case of the glucose syrups mentioned above.

An alternative approach to the problem is to include in the foodstuff composition an ingredient which is designed to counteract the sweetness of the sugar. Thus, for example, the Virginia Dare Extract Company, Inc. of Brooklyn N.Y., U.S.A. are now marketing a blend of natural ingredients under the trade mark Contrasweet ®, for incorporation into confections such as creams, liquid centres, caramels, icings and fillings, fondants, fudges, hard candies etc. The problem with such a blend of natural ingredients, however, is that, apart from the fact that the sweetness-decreasing effect is limited, the material is strongly coloured and has a tendency to impart undesirable colour to pale products, particularly icings and fillings.

We have now found that a particular class of non-toxic, substantially colourless, phenylalkanoic acid salts can effectively reduce the sweetness of sucrose and other sweeteners by 80% or even more when present in relatively small amounts. According to the present invention, there is provided a method of reducing the sweetness of an ingestible product containing a sweetening sugar or sugar alcohol by incorporating therein a sweetness-reducing amount of at least one compound of the general formula:

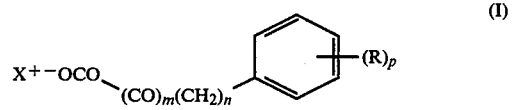

(I)

in which m represents 0 or 1, and when m represents 0, n represents 1, 2 or 3, and p represents 1, 2, 3 or 4, and when m represents 1, n represents 1 or 2 and p represents 0, 1, 2, 3 or 4; the substituents R, which may be the same or different, each represent a lower alkoxy group, e.g. with 1 to 5 carbon atoms such as a methoxy, ethoxy, isopropoxy or t-butoxy group, a phenoxy group or a lower alkyl or trifluoromethyl group; and/or two substituents R together represent an aliphatic chain linked to the phenyl ring at two positions, either directly or via an oxa-group, e.g. an alkylenedioxy, alkenylenedioxy, alkylenoxy or alkenylenoxy group; and/or one substituent R represents a hydroxy group while at least one other substituent R represents an alkoxy group; and $X^+$ represents a physiologically acceptable cation.

By an "ingestible product" there is meant one which in the ordinary course of use is intended to be swallowed, for instance, a foodstuff or beverage, or an orally administered pharmaceutical composition. The invention is particularly concerned with articles of confectionery.

In the compound of the general formula (I), $X^+$ preferably represents an alkali metal, alkaline earth metal, or ammonium cation, especially the sodium ion and also the potassium or calcium ion, but can also represent a hydrogen ion. R preferably represents a methoxy group. Particularly advantageous results are obtained with the compounds of the general formula (I) in which m represents 0 and n represents 1, namely derivatives of phenyl acetic acid. In this series of compounds, the substituents R are preferably present in the 3- and 4-positions or in the 4-position alone. In the series where m represents 0 and n represents 2, namely the derivatives of phenyl propionic acid, the substituents R are preferably present in the 3- and 4-positions as before, optionally in combination with a third substituent R in the 2- or 5-position. A single substituent R also gives good results, in any of the 2-, 3- or 4-positions.

In the series in which n represents 3, namely derivatives of phenylbutyric acid, the substituents R are again preferably in the 3- and 4-positions or in the 4-position alone.

In the series where m represents 1 and n represents 1, namely derivatives of phenyl pyruvic acid, notable reduction of sweetness occurs when p represents 0, i.e. salts of phenylpyruvic acid itself. Otherwise substituents R are desirable, especially in the 3- and/or 4 portions.

Thus, in general, the most preferred pattern of substitution of the phenyl ring is for a substituent R to be in the p-position, preferably in combination with another substituent R in the m-position.

Particularly preferred compounds for use according to the present invention thus include the alkali metal salts of:
1. 4-methoxyphenylacetic acid
2. 3,4-dimethoxyphenylacetic acid
3. 3-(2-methoxyphenyl)propionic acid
4. 1,4-benzodioxan-6-acetic acid
5. 4-ethoxyphenylacetic acid
6. 3-(3,4-dimethoxyphenyl)propionic acid
7. 3-(2,3,4-trimethoxyphenyl)pripionic acid
8. 3-(3,4,5-trimethoxyphenyl)propionic acid Other compounds of interest include the alkali metal salts of:
9. 3-(4-methoxyphenyl)propionic acid
10. 4-(4-methoxyphenyl)butyric acid
11. 2-methoxyphenylacetic acid
12. 3-methoxyphenylacetic acid
13. 4-methylphenylacetic acid
14. 4-trifuoromethylphenylacetic acid
15. phenylpyruvic acid All of these compounds are known compounds and are listed, for example, in the catalogue of Aldrich Co, Ltd.

Alternatively, compounds of the general formula (I) may be synthesised by methods known in this art. For example of method of Harries and Adam (Berichte, 49, 1030, 1916) provides compounds in which p=2 ( in the 3- and 4- positions) and R represents a 3-methoxy group and a 4-alkoxy group, by reaction of eugenol by etherification and oxidation. Another general method involves the use of a corresponding substituted benzyl alcohol which is converted via the halide to the nitrile and hence to the carboxylic acid (Kondo and Oshima, J. Pharm. Soc, Japan, 51, 979, 1931). The intermediate phenylacetonitrile may also be used as the starting material.

Phenylpropionic acid derivatives of formula (I) may be prepared by the method of Schopf et al. (Ann., 497, 52, 1932) by reduction of the corresponding cinnamic acid derivative, itself obtainable by a Perkin condensation of the appropriate benzaldehyde with acetic annhydride in the presence of sodium acetate.

Pyruvic acid derivatives of formula (I) are obtainable by the method of Haworth et al. (J. Chem. Soc., 125, 1686, 1924) by condensation of the appropriate benzaldehyde with hippuric acid (benzamidoacetic acid) via an azlactone which is hydrolysed to give the arylpyruvic acid. This product can, in turn be oxidised to the corresponding arylacetic acid.

We have found that the compounds of the general formula (I) are effective, for example, at a level of about 0.01 to 0.25% by weight of the composition, especially about 0.02 to 0.20%. Except at very high levels of sucrose, the ratio of inhibitor to sweetener is relevant and a range of about 0.1 to 2 parts by weight per hundred parts by weight of sucrose is effective. At this level, for example 1 part per 100 parts of sucrose, sodium 3,4-dimethoxyphenylacetate or sodium 4-methoxyphenylacetate gives a reduction in sweetness of over 80% when applied to a 5% sucrose solution. On a molar basis, about 0.01 to 0.02 moles of compound of formula (I) per mole of sucrose is required. Lesser sweetness reductions can obviously be obtained by incorporating the compound of formula (I) at lower levels. For other sweeteners, for example, a high glucose or fructose syrup, a similar effect can be obtained at a sweetness-related level, that is to say at a level similar to that used to reduce the sweetness of a corresponding amount of sucrose. However, the main commercial interest will obviously lie in use with sucrose. The compounds of use according to this invention do not diminish other flavours present in a foodstuff and do not discolour the product.

The compounds of the general formula (I) are non-toxic and substantially tasteless. In mice they have an $LD_{50}$ of well over 1 g/Kg (no deaths at this level). The compound sodium 3,4-dimethoxyphenylacetate gives a negative Ames test in *S. typhimurium*.

The compounds were tested accordingly to the following protocol:

Sweetness Inhibitors: Dose-Response

The following inhibitors were compared at equimolar concentrations.
1. 4-ethoxyphenylacetic acid (Na+)
   (M.W.=180.15)
2. 3,4-dimethoxyphenylacetic acid (Na+)
   (M.W.=196.2)
3. 3-(3,4-dimethoxyphenyl)propionic acid (Na+)
   (M.W.=210.23)

Three experiments were carried out. At each experiment a different concentration of inhibitor was tested:

| | | inhibitor concentrations |
|---|---|---|
| Experiment | I | 0.0008 M |
| | II | 0.0016 M |
| | III | 0.0032 M |

For each experiment, all inhibitors were compared at the same concentration in 3 different sucrose concentrations.
(a) 0.15M sucrose=5.13% w/v
(b) 0.225M sucrose=7.695%
(c) 0.03M sucrose=10.26%

Selection of Panellists

Panellists were given standard reference sucrose solutions 2%, 3%, 4%, 5%, 6%, 7%, 8%, 9%, 10% w/v. in Malvern water. Using these reference solutions, they were asked to estimate the sweetness of a number of coded test sucrose solutions: 2.8, 5.5, 8.2, 3.6, 7.9, 6.4, 4.7, 8.8, 2.2% w/v sucrose in Malvern water.

Panellists were instructed to sip and spit and to rinse well with water between samples.

20 panellists were selected to participate in the sweetness inhibition experiments. These panellists all correctly estimated the % sucrose to ±0.6% sucrose on average. A graph of actual sucrose concentration % w/v against perceived concentrations of sucrose % w/v for these 20 panellists is shown as Graph A in the accompanying drawings.

In analysing Graph A, it will be seen that the intercept is −0.1337 and the gradient is 1.0202, giving a correlation coefficient of 0.9991.

Panel Experiments

All samples were prepared in Malvern water. Reference samples were prepared at 2%, 3%, 4%, 5%, 6%, 7%, 8%, 9%, 10% sucrose w/v. The panellists were provided with the following test samples containing inhibitors:

Experiment I

| Inhibitor | | Conc. Inhibitor (Moles/liter) | Conc. Sucrose (Moles/liter) | Conc. Inhibitor (% w/v) | Conc. Sucrose (% w/v) |
| --- | --- | --- | --- | --- | --- |
| 1 | (a) | 0.0008 | 0.15 | 0.01441 | 5.13 |
|   | (b) | " | 0.225 | " | 7.695 |
|   | (c) | " | 0.30 | " | 10.26 |
| 2 | (a) | 0.0008 | 0.15 | 0.01570 | 5.17 |
|   | (b) | " | 0.225 | " | 7.695 |
|   | (c) | " | 0.30 | " | 10.26 |
| 3 | (a) | 0.0008 | 0.15 | 0.01682 | 5.13 |
|   | (b) | " | 0.225 | " | 7.695 |
|   | (c) | " | 0.30 | " | 10.26 |

Experiment II

| Inhibitor | | Conc. Inhibitor (Moles/liter) | Conc. Sucrose (Moles/liter) | Conc. Inhibitor (% w/v) | Conc. Sucrose (% w/v) |
| --- | --- | --- | --- | --- | --- |
| 1 | (a) | 0.0016 | 0.15 | 0.02882 | 5.13 |
|   | (b) | " | 0.225 | " | 7.695 |
|   | (c) | " | 0.30 | " | 10.26 |
| 2 | (a) | 0.0016 | 0.15 | 0.03139 | 5.13 |
|   | (b) | " | 0.225 | " | 7.695 |
|   | (c) | " | 0.30 | " | 10.26 |
| 3 | (a) | 0.0016 | 0.15 | 0.03364 | 5.13 |
|   | (b) | " | 0.225 | " | 7.695 |
|   | (c) | " | 0.30 | " | 10.26 |

Experiment III

| Inhibitor | | Conc. Inhibitor (Moles/liter) | Conc. Sucrose (Moles/liter) | Conc. Inhibitor (% w/v) | Conc. Sucrose (% w/v) |
| --- | --- | --- | --- | --- | --- |
| 1 | (a) | 0.0032 | 0.15 | 0.05764 | 5.13 |
|   | (b) | " | 0.225 | " | 7.695 |
|   | (c) | " | 0.30 | " | 10.26 |
| 2 | (a) | 0.0032 | 0.15 | 0.06278 | 5.13 |
|   | (b) | " | 0.225 | " | 7.695 |
|   | (c) | " | 0.30 | " | 10.26 |
| 3 | (a) | 0.0032 | 0.15 | 0.06728 | 5.13 |
|   | (b) | " | 0.225 | " | 7.695 |
|   | (c) | " | 0.30 | " | 10.26 |

The inhibitor/sucrose solutions in the above experiments were tasted by a small laboratory panel to make sure sweetness levels lay within the range of the sucrose references before presenting the samples to the 20 panellists (experiments I, II, III).

Procedure for Making up the Inhibitors/Sucrose Solutions

The inhibitor was dissolved in Malvern water with heat and stirring and made up to approximately 9/10 volume. Food grade N/10 NaOH was added until pH=8.32 (that of Malvern water). This solution was then added to sucrose weighed into a volumetric flask and water added to full volume.

Presentation to Panellists

At no time during the experiment were the panellists told that they were testing sweetness inhibitors (a bias could have resulted if this were the case). Panellists were given the 9 labelled reference sucrose solutions (2%-10% sucrose) which they could taste whenever they wanted. In each experiment, the 9 test sucrose/inhibitors were presented coded with a 2 digit random number. The order of presentation of samples was randomised across the 20 panellists. Panellists were instructed to sip and spit and to rinse well with water between tasting samples and references.

Results

Each inhibitor concentration experiment (I, II, & III) was analysed separately. Each experiment was treated as a [20 (panellists)×3(inhibitor 1,2,3)×3 (sucrose concentration a,b,c)] experiment and analysis of variance carried out to determine differences between the effects of panellists inhibitors and sucrose concentrations and to determine any interactions between the effects of panellists, inhibitors and sucrose concentrations and to determine the factors.

From the means of all the 20 panellists results, regression lines were drawn of perceived sucrose concentration against actual sucrose concentration for each inhibitor at each concentration and graphs were drawn of % inhibition against actual sucrose concentration using the formula $$\% \text{ inhibition} = (\text{Conc. A} - \text{Conc.P})/\text{Conc.A} \times 100$$

(where Conc.A is the actual sucrose concentration and Conc.P is the perceived sucrose concentration) (Graph B in the accompanying drawings).

Conclusions

From Graph B it can be seen that over the sucrose concentrations studied, the % inhibition is slightly greater at lower sucrose concentrations. However there is only a 10-15% change in % inhibition between 0.15M sucrose and 0.30M sucrose for all inhibitors at all concentrations.

These are, of course, model aqueous solutions and do not bear a close resemblance to actual product situations where fat, protein, starch and other ingredients are present and can influence perception of sweetness. A cake, for example, may contain about 25% sucrose but an aqueous solution at this concentration would be very unpleasant.

The following Examples illustrate the invention further:

EXAMPLE 1

Sponge Cake

Sodium 3,4-dimethoxyphenylacetate was added at a level of 0.07% or 0.14% by weight to the following mix, after addition of the egg.

| | |
| --- | --- |
| margarine | 227 g |
| caster sugar | 227 g |
| 4 eggs | 232 g |
| self-raising flour | 227 g |

The fat and sugar were creamed together and the eggs beaten in. The flour was then folded in and the mixture divided into paper cases (20-25 g portions) and baked 25 minutes at 350°-375° F. (177°-190° C.). Cakes containing the inhibitor were noticeably less sweet, especially at the 0.14% level.

EXAMPLE 2

Royal Icing 2 egg whites  
400 g icing sugar (sieved)

5 ml glycerine

The egg whites were beaten and the icing sugar mixed in gradually until smooth. The glycerine was then beaten in and sodium 3-(3,4-dimethoxyphenyl)propionate was added at 0.07% by weight. At 0.07% level of inhibitor, the icing was noticeably less sweet than a control. The effect was less marked than in cakes.

EXAMPLE 3

Butter Icing/Filling 100 g butter
100 g icing sugar (sieved)
10 ml hot water.

The fat and sugar were creamed, the water was mixed in, and flavour added (e.g. 1 dsp. cocoa dissolved in water and cooled). Sodium 4-methoxyphenylacetate was dissolved in a small amount of water and incorporated into the icing at 0.07% by weight.

The icing containing 0.07% inhibitor was obviously less sweet than a control containing no inhibitor.

EXAMPLE 4

Boiled Sweets (Lemon)

| | |
|---|---|
| 325 g | sucrose |
| 175 g | glucose syrup: 42DE |
| 100 g | water |
| 7 g | malic acid |
| 1 ml | oil of lemon flavouring. |

The water and sugar were boiled, the glucose syrup added at 110° C., and temperature increased to 145° C. Sodium 1,4-benzodioxan-6-acetate was added at 0.13% by weight.

The mixture poured onto an oiled marble slab, the acid and flavouring were kneaded in, and the mass was then cut into individual sweets.

EXAMPLE 5

Toffee

| | |
|---|---|
| 120 g | Sucrose |
| 120 g | Full cream condensed milk |
| 120 g | Glucose syrup: 42 DE |
| 50 g | Hard fat (m.p. 32° C.) |
| 12 g | Butter |
| 0.13 g | Vanillin |
| 1.0 g | Salt |

All the ingredients except vanillin and butter were heated slowly to dissolve, then cooled to a temperature of 130° C. The vanillin and butter were added on removing from heat, together with sodium 4-ethoxyphenyl-acetate at 0.13% by weight, and the mass was poured onto an oiled slab, allowed to cool, and cut.

EXAMPLE 6

Transformed Sucrose Product

A sucrose syrup was transformed into a microcrystalline solid by the process of UK Pat. No. 1460614. The syrup contained 90% sucrose by weight plus 0.1% of sodium 3,4-dimethoxyphenylacetate. The product was a dry, friable, particulate product which could be used in a range of bakery and confectionery applications. Higher levels of the inhibitor (up to 1 or 2%) can be addd instead of 0.1%.

A glucose solid can be obtained from a glucose syrup containing the same inhibitor, by the process of UK Pat. No. 2070015.

I claim:

1. A method of reducing the sweetness of an ingestible product containing a sweetening sugar or sugar alcohol by incorporating therein a sweetness-reducing amount of at least one compound of the general formula:

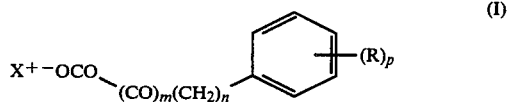

in which m represents 0 or 1, and when m represents 0, n represents 1, 2 or 3, and p represents 1, 2, 3 or 4, and when m represents 1, n represents 1 or 2 and p represents 0, 1, 2, 3 or 4; the substitutents R individually represent a lower alkoxy group phenoxy group or a lower alkyl or trifluoromethyl group; two substituents R together represent an aliphatic chain linked to the phenyl ring at two positions, directly or via an oxagroup, or one substituent R represents a hydroxy group while at least one other substituent R represents an alkoxy group; and $X^+$ represents a physiologically acceptable cation.

2. A method according to claim 1, in which m represents 0, n represents 1, and substituents R are present in the 3- and 4-positions or the 4-position alone.

3. A method according to claim 1, in which m represents 0, n represents 2 and substituents R are present in the 3- and 4-positions; in the 2-, 3- and 4-positions; in the 3-, 4- and 5-positions; or in any one of the 2-, 3- and 4-positions.

4. A method according to any one of claims 1 to 3 in which R represents an alkoxy group or two substituents R together represent an alkylenedioxy group.

5. A method according to claim 4, in which R represents a methoxy or ethoxy group or two substituents R together represent an ethylenedioxy group.

6. A method according to claim 1, in which $X^+$ represents an alkali metal cation.

7. A method according to claim 6, in which the compound of formula (I) is a salt of:
4-methoxyphenylacetic acid
3,4-dimethoxyphenylacetic acid
3-(2-methoxyphenyl)propionic acid
1,4-benzodioxan-6-acetic acid
4-ethoxyphenylacetic acid
3-(3,4-dimethoxyphenyl)propionic acid
3-(2,3,4-trimethoxyphenyl)propionic acid
3-(3,4,5-trimethoxyphenyl)propionic acid.

8. A method according to claim 1, in which said amount is of 0.02 to 0.20% by weight.

9. A method according to claim 1, in which the lower alkoxy group contains 1 to 5 carbon atoms.

10. A method according to claim 1, in which two substituents R are linked to the phenyl ring at two positions to form an alkylenedioxy, alkenylenedioxy, alkylenoxy or alkenylenoxy group.

11. An ingestible product comprising a sweetening sugar and a sweetness-reducing amount of at least one compound of the general formula (I)

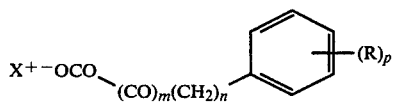

in which m represents 0 or 1, and when m represents 0, n represents 1, 2 or 3, and p represents 1, 2, 3 or 4, and when m represents 1, n represents 1 or 2 and p represents 0, 1, 2, 3 or 4; the substituents R individually represent a lower alkoxy group, phenoxy group or a lower alkyl or trifluoromethyl group; or two substituents R together represent an aliphatic chain linked to the phenyl ring at two positions directly or via an oxa-group; or one substituent R represents a hydroxy group while at least one other substituent R represents an alkoxy group; and $X^+$ represents a physiologically acceptable cation.

12. A product according to claim 11 in the form of a pharmaceutical concentrated glucose oral product.

13. A composition according to claim 12 containing 0.1 to 2% by weight of said compound of formula (I).

14. A composition comprising sucrose or glucose in the form of a solid or syrup and a sweetness-reducing amount of at least one compound of the general formula (I)

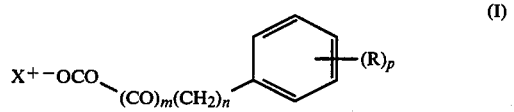

in which m represents 0 or 1, and then m represents 0, n represents 1, 2 or 3, and p represents 1, 2, 3 or 4, and when m represents 1, n represents 1 or 2 and p represents 0, 1, 2, 3 or 4; the substituents R individually represent a lower alkoxy group, phenoxy group or a lower alkyl or trifluoromethyl group; or two substituents R together represent an aliphatic chain linked to the phenyl ring at two positions directly or via an oxa-group; or one substituent R represents a hydroxy group while at least one other substituent R represents an alkoxy group; and $X^+$ represents a physiologically acceptable cation.

* * * * *